(12) United States Patent
Lin

(10) Patent No.: US 7,157,657 B2
(45) Date of Patent: Jan. 2, 2007

(54) MOBILE ELECTRONIC DEVICE AND BUTTON ASSEMBLY THEREOF

(75) Inventor: Hsin-Ping Lin, Taipei (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 11/404,291

(22) Filed: Apr. 14, 2006

(65) Prior Publication Data

US 2006/0243580 A1 Nov. 2, 2006

(30) Foreign Application Priority Data

Apr. 28, 2005 (TW) .............................. 94113645 A

(51) Int. Cl.
*H01H 1/10* (2006.01)

(52) U.S. Cl. ...................... 200/517; 200/5 A; 200/406; 200/516; 345/169

(58) Field of Classification Search ................. 200/517
See application file for complete search history.

(56) References Cited

U.S. PATENT DOCUMENTS

| 6,744,890 | B1 * | 6/2004 | Le et al. ................. 379/433.07 |
| 6,760,015 | B1 * | 7/2004 | Osterg.ang.rd et al. ..... 345/169 |
| 6,806,815 | B1 * | 10/2004 | Kaikuranta et al. ........... 341/22 |
| 2004/0203525 | A1 * | 10/2004 | Gillette et al. ............. 455/90.3 |

* cited by examiner

*Primary Examiner*—Elvin Enad
*Assistant Examiner*—Lheiren Mae A. Anglo
(74) *Attorney, Agent, or Firm*—Quintero Law Office

(57) ABSTRACT

A mobile electronic device is disclosed. The device includes a printed circuit board, a first button module, a second button module and an actuator module. The printed circuit board has a first surface and a second surface opposite to the first surface. The first button module includes a plurality of first dome-like switches disposed on the first surface. The second button module includes a plurality of second dome-like switches disposed on the second surface. The actuator module actuates the plurality of first and second dome-like switches.

8 Claims, 3 Drawing Sheets

MOBILE ELECTRONIC DEVICE AND BUTTON ASSEMBLY THEREOF

BACKGROUND

The invention relates to a mobile electronic device, and in particular to a mobile electronic device with a button assembly.

In recent years, mobile electronic devices, such as cellular phones, electronic dictionaries and personal digital assistants (PDAs) have become widely popular. It is important, however, to efficiently use the limited space when the volume of the mobile electronic device is continually decreasing.

SUMMARY

Accordingly, the present invention provides a mobile electronic device. The device comprises a printed circuit board, a first button module, a second button module and an actuator module. The printed circuit board has a first surface and a second surface opposite to the first surface. The first button module comprises a plurality of first dome-like switches disposed on the first surface. The second button module comprises a plurality of second dome-like switches disposed on the second surface. The actuator module actuates the plurality of first and second dome-like switches.

The printed circuit board is parallel to a standard plane. The plurality of first dome-like switches and the second dome-like switches are partially overlapped when projected on the printed circuit board.

The projections of the plurality of first and second dome-like switches on the standard plane are substantially circular.

The mobile electronic device further comprises a base with the printed circuit board disposed thereon.

The base comprises a plurality of recesses corresponding to the plurality of second dome-like switches.

The base further comprises a plurality of tabs respectively disposed in the plurality of recesses. When the actuator module actuates the plurality of second dome-like switches, the plurality of second dome-like switches contacts the plurality of tabs.

The profiles of the plurality of recesses correspond to profiles of the plurality of second dome-like switches.

The plurality of recesses comprises a substantially columnar profile.

The actuator module comprises a plurality of first protrusions and a plurality of second protrusions. Each first protrusion has a first contact surface, and each second protrusion has a second contact surface. The plurality of first protrusions contacts the plurality of first dome-like switches by the plurality of first contact surfaces. The plurality of second protrusions contacts the plurality of second dome-like switches by the plurality of second contact surfaces.

The area of the plurality of second contact surfaces exceeds area of the plurality of first contact surfaces.

Accordingly, the present invention also provides a button assembly. In an exemplary embodiment, the assembly comprises a printed circuit board, a first button module and a second button module. The printed circuit board is parallel to a standard plane and has a first surface and a second surface. The first button module comprises a first dome-like switch disposed on the first surface. The second button module comprises a second dome-like switch disposed on the second surface. The first dome-like switches and second dome-like switches are partially overlapped when projecting on the standard plane.

The first button module comprises a plurality of first dome-like switches, and the second button module comprises a plurality of second dome-like switches. The plurality of first dome-like switches and the plurality of second dome-like switches are alternately and respectively disposed on the first and second surfaces of the printed circuit board.

When the plurality of first and second dome-like switches projects onto the standard plane, each projected second dome-like switch is placed between two adjacent first dome-like switches.

The pluralities of first and second dome-like switches disposed on the first and second surfaces are respectively arranged in array.

The printed circuit board comprises a flexible printed circuit board.

A detailed description is given in the following embodiments with reference to the accompanying drawings.

DESCRIPTION OF THE DRAWINGS

The invention can be more fully understood by reading the subsequent detailed description in conjunction with the examples and references made to the accompanying drawings, wherein.

DETAILED DESCRIPTION

Figure 1:
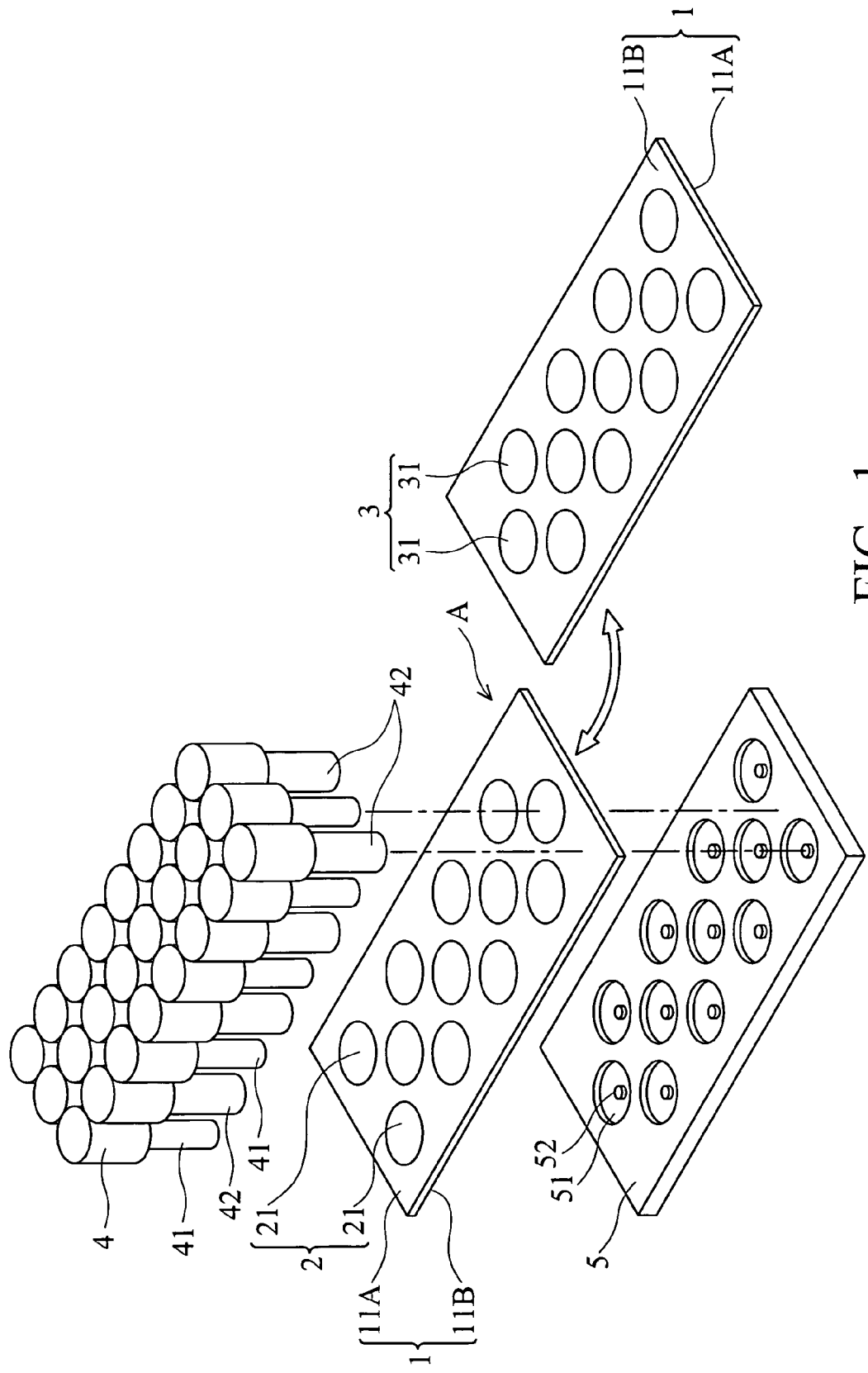
FIG. 1 is a schematic view of a mobile electronic device of the invention.

Referring to FIG. 1, the mobile electronic device comprises a button assembly A, an actuator module 4 and a base 5, all disposed in a housing (not shown) of the mobile electronic device. The button assembly A is disposed on the base 5. The actuator module 4 comprises a plurality of first protrusions 41 and a plurality of second protrusions 42, actuating the button assembly A. Additionally, the base 5 comprises a plurality of recesses 51 and a plurality of tabs 52 respectively disposed in the plurality of recesses 51.

The button assembly A comprises a printed circuit board 1(such as a flexible printed circuit board), a first button module 2 and a second button module 3. FIG. 1 depicts both sides of the printed circuit board, the first surface 11A and the second surface 11B. The first button module 2 comprises a plurality of first dome-like switches 21. The second button module 3 comprises a plurality of second dome-like switches 31. The first dome-like switches 21 are disposed on the first surface 11A of the printed circuit board 1, and arranged in an array. The second dome-like switches 31 are disposed on the second surface 11B of the printed circuit board 1, and arranged in an array.

Figure 2:
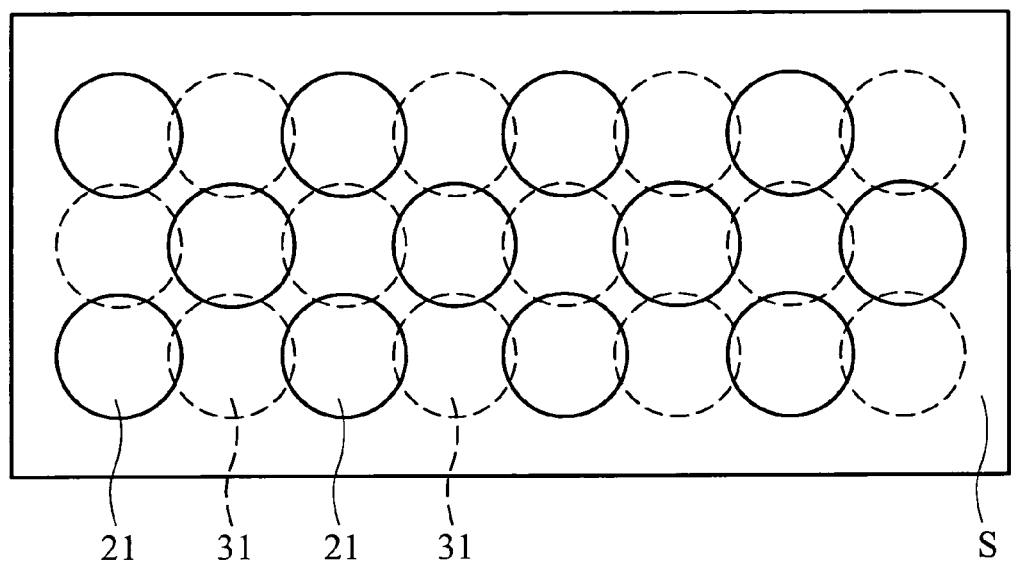
FIG. 2 is a schematic view of a button assembly projected on a standard plane.

Referring to FIG. 2, the printed circuit board 1 is parallel to a standard plane S. When the first dome-like switches 21 and the second dome-like switches 31 are projected onto the standard plane S, the first dome-like switches 21 and second dome-like switches 31 are substantially circular and partially overlapped. In FIG. 2, the first dome-like switches 21 are depicted in solid lines, and the second dome-like switches 31 are depicted dashed lines. As mentioned, in other words, the first and second dome-like switches 21 and 31 are alternately disposed on the first and second surfaces 11A and 11B. When the first dome-like switches 21 and the second dome-like switches 31 are projected onto the standard plane S, each projected first dome-like switch 21 is placed between two adjacent second dome-like switches 31, or each projected second dome-like switch 31 is placed between two adjacent first dome-like switches 31.

Figure 3:
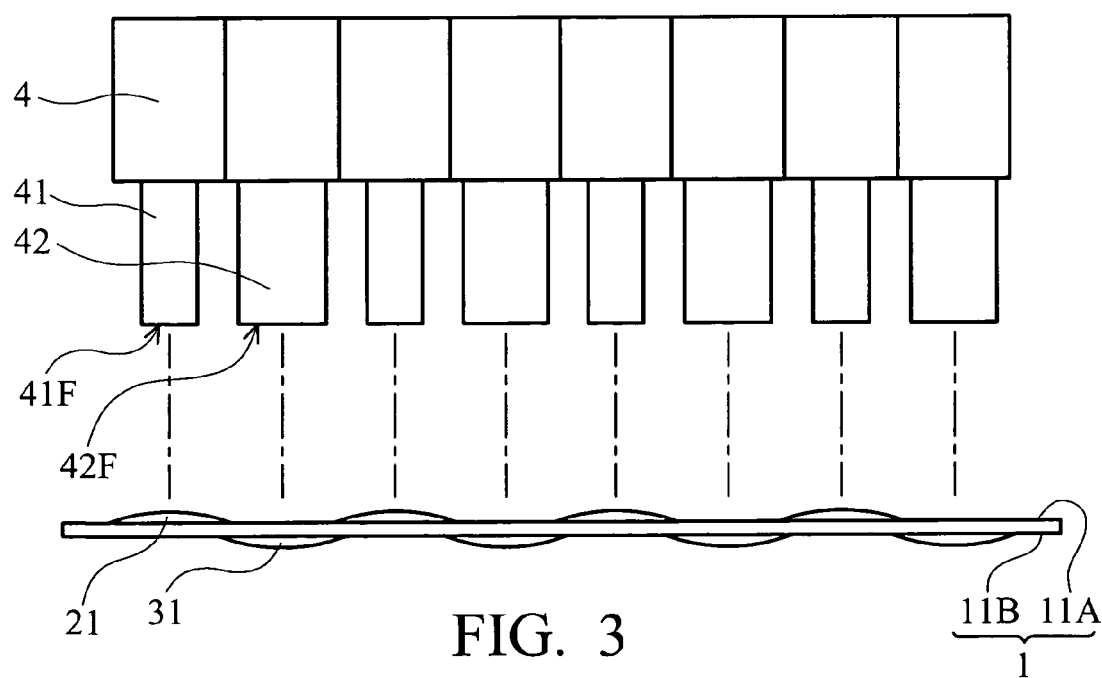
FIG. 3 is an enlarged view of a mobile electronic device of the invention.
Figure 4:
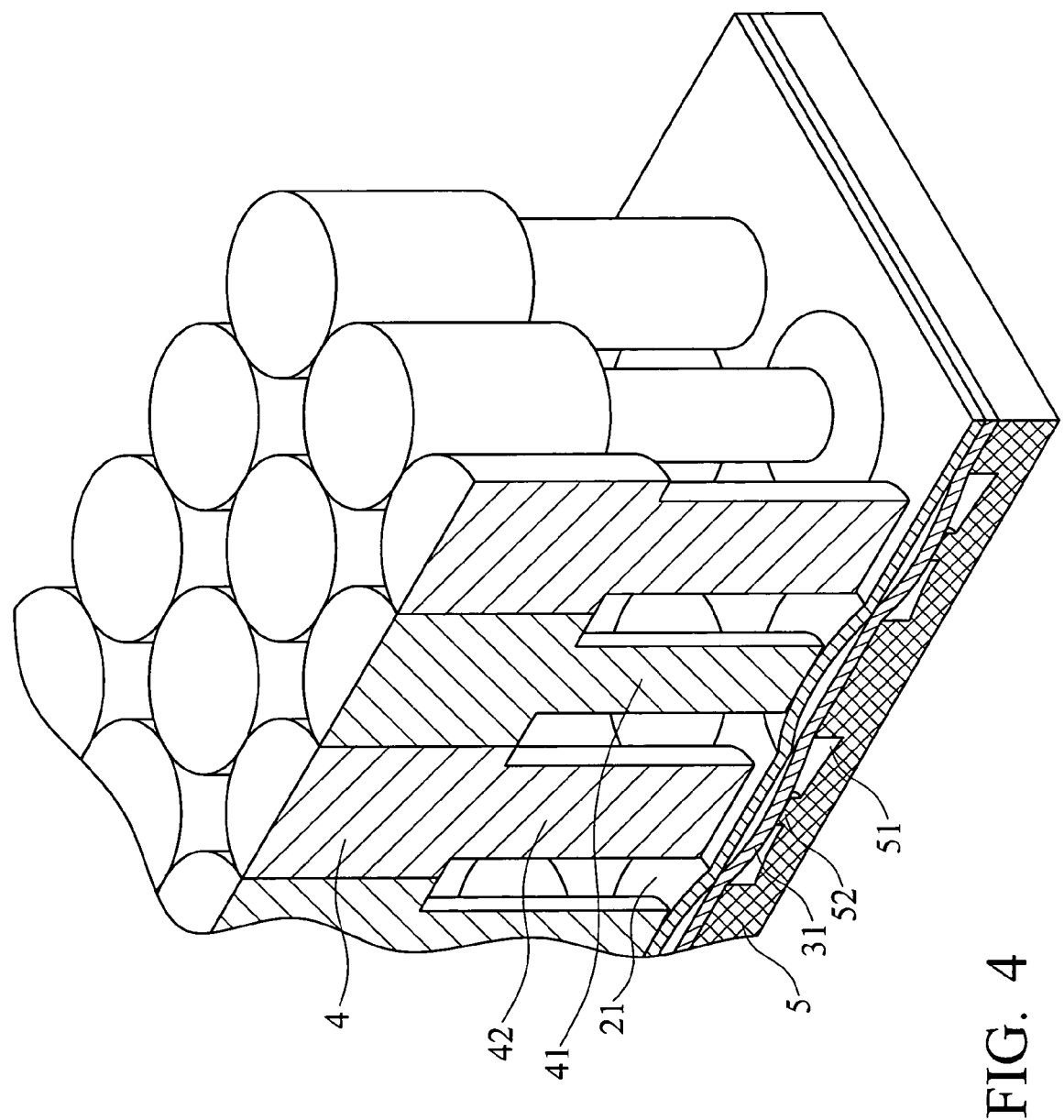
FIG. 4 is a partial enlarged view of a mobile electronic device of the invention.

Referring to FIGS. 1, 3 and 4, the first protrusions 41 of the actuator module 4 correspond to the first dome-like switches 21 of the first module 2 and the area of the base 5 without recesses 51. The second protrusions 42 of the actuator module 4 corresponds to the second dome-like switches 31 of the second module 3 and the recesses 51 of the base 5. A button panel (not shown) of the mobile electronic device is disposed above the actuator module 4, on which pluralities of characters and symbols are printed.

When the button panel is pushed downward to move the first protrusions 41, the first protrusions 41 abut the first dome-like switches 21. The backside of the first dome-like switches 21(at second surface 11B side) is planar, and abuts the area of the base 5 without recesses 51. Namely, the base 5 supports the first dome-like switches 21 from the backside thereof, and the first dome-like switches 21 are electrically connected to the printed circuit board 1. When the button panel is pushed downward to move the second protrusions 42, the second protrusions 42 abut the backside of second dome-like switches 31 (at first surface 11A side). The second dome-like switches 31 move downward to contact the tabs 52 in the recesses 51 of the base 5. Namely, the tabs 52 of the base 5 supports second dome-like switches 31, and the second dome-like switches 31 are electrically connected to the printed circuit board 1.

As mentioned, to ensure the second protrusions 42 actuate the second dome-like switches 31, the second protrusions 42 are larger than the first protrusions 41. For example, the first protrusion 41 has a first contact surface 41F, and the second protrusion 42 has a second contact surface 42F. The area of the second contact surface 42F exceeds the area of the first contact surface 41F.

Furthermore, the profile of the recess 51 corresponds to the profile of the second dome-like switch 31. For example, the recess 51 comprises a substantially columnar profile.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A mobile electronic device, comprising:
   a printed circuit board, having a first surface and a second surface opposite to the first surface;
   a first button module comprising a plurality of first dome-like switches disposed on the first surface;
   a second button module comprising a plurality of second dome-like switches disposed on the second surface;
   an actuator module, actuating the pluralities of first and second dome-like switches; and
   a base with the printed circuit board disposed thereon, wherein the base comprises a plurality of recesses corresponding to the plurality of second dome-like switches.

2. The mobile electronic device as claimed in claim 1, wherein the plurality of first dome-like switches and the plurality of second dome-like switches are partially overlapped when projected on the printed circuit board.

3. The mobile electronic device as claimed in claim 2, wherein the projections of the plurality of first and second dome-like switches on the printed circuit board are substantially circular.

4. The mobile electronic device as claimed in claim 1, wherein the base further comprises a plurality of tabs respectively disposed in the plurality of recesses, when the actuator module actuates one of the plurality of second dome-like switches, the one of the plurality of second dome-like switches contacts a corresponding one of the plurality of tabs.

5. The mobile electronic device as claimed in claim 1, wherein a profile of the plurality of recesses corresponds to a profile of the plurality of second dome-like switches.

6. The mobile electronic device as claimed in claim 1, wherein the plurality of recesses comprises a substantially columnar profile.

7. The mobile electronic device as claimed in claim 1, wherein the actuator module comprises a plurality of first protrusions and a plurality of second protrusions, each first protrusion has a first contact surface, each second protrusion has a second contact surface, the plurality of first protrusions contacts the plurality of first dome-like switches by the plurality of first contact surfaces, and the plurality of second protrusions contacts the plurality of second dome-like switches by the plurality of second contact surfaces.

8. The mobile electronic device as claimed in claim 7, wherein an area of the plurality of second contact surfaces exceeds an area of the plurality of first contact surfaces.

* * * * *